May 10, 1932.     J. F. FIALA     1,857,536
COMBINATION GRASS AND GRAIN PLANTER
Filed Feb. 19, 1930     6 Sheets-Sheet 1

Inventor
Joseph F. Fiala

By Clarence A. O'Brien
Attorney

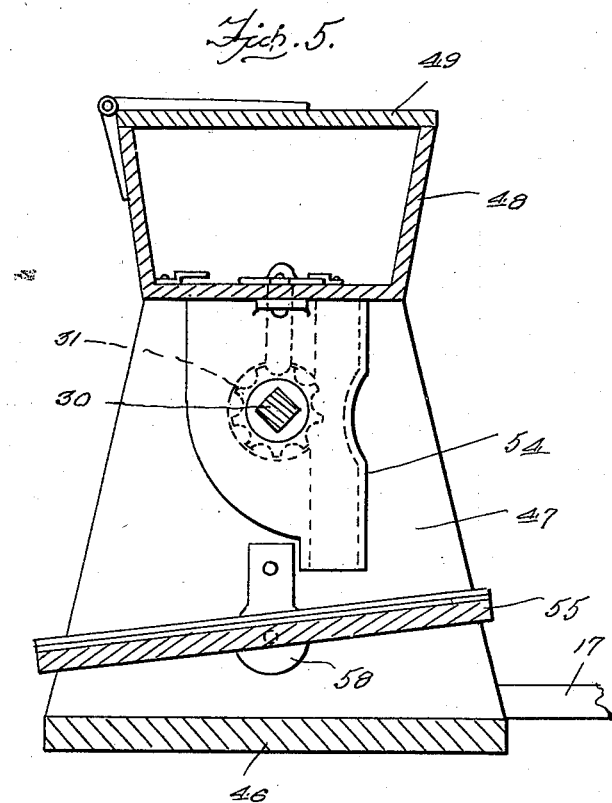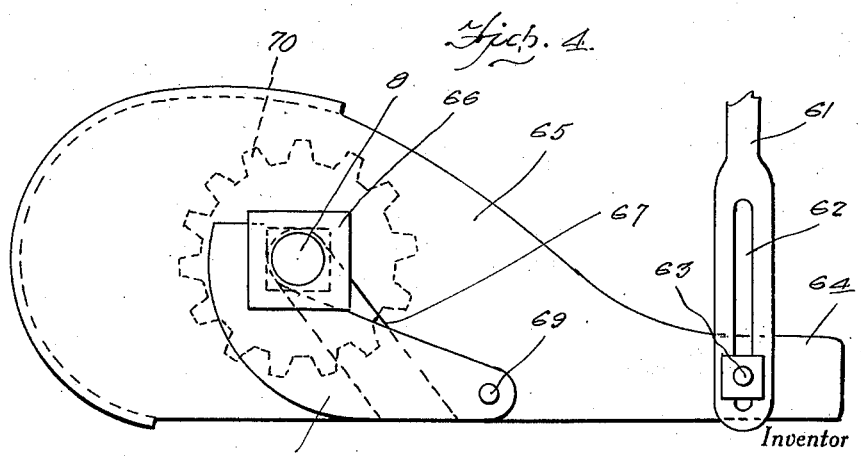

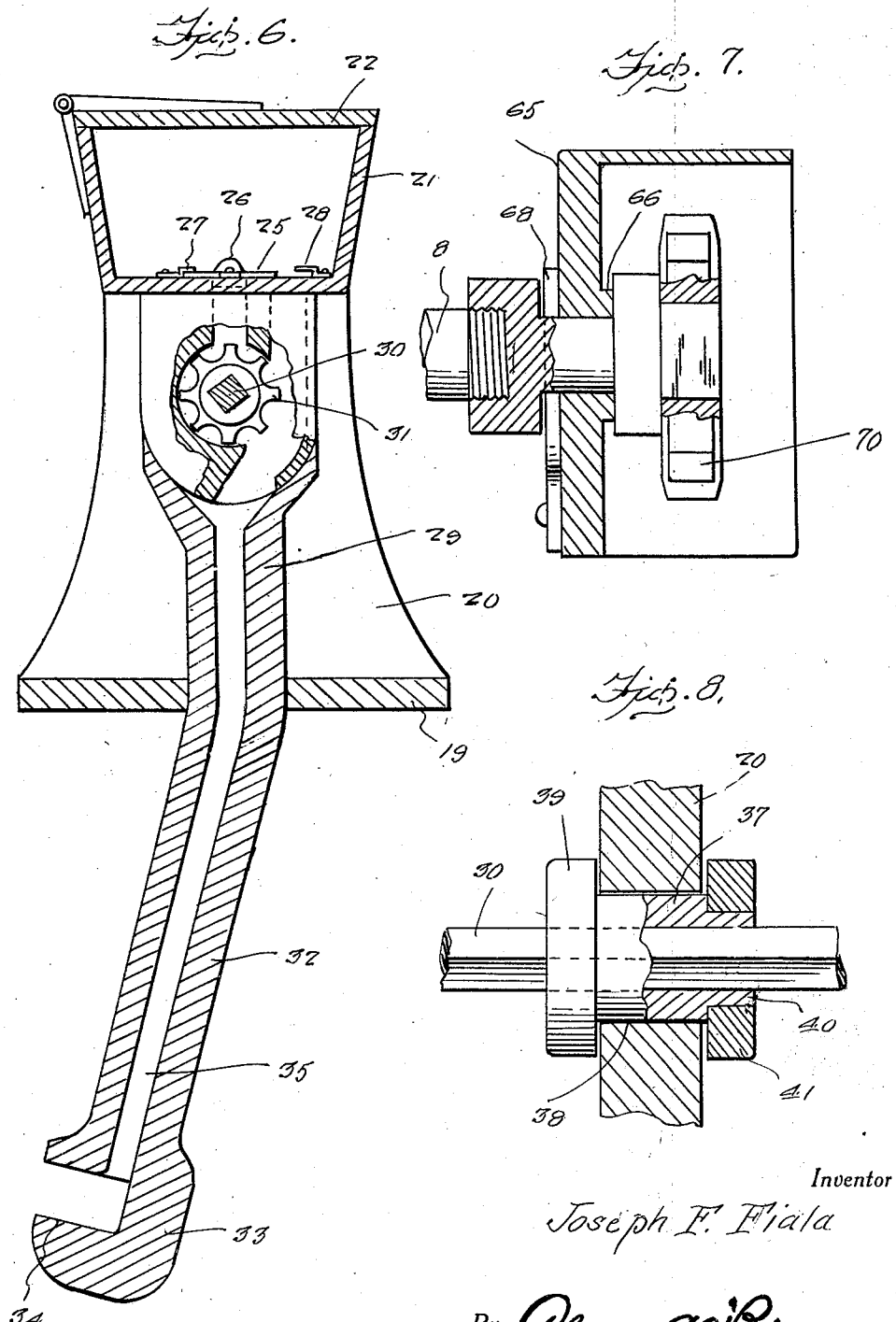

May 10, 1932. J. F. FIALA 1,857,536
COMBINATION GRASS AND GRAIN PLANTER
Filed Feb. 19, 1930  6 Sheets-Sheet 6
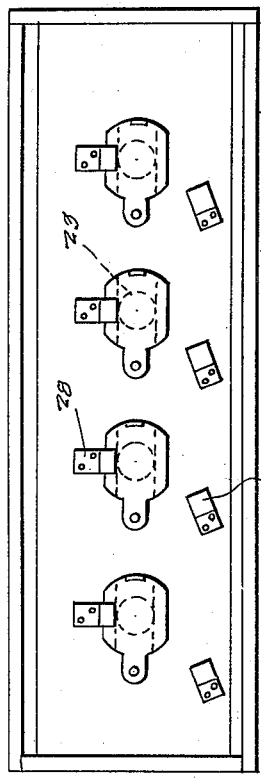
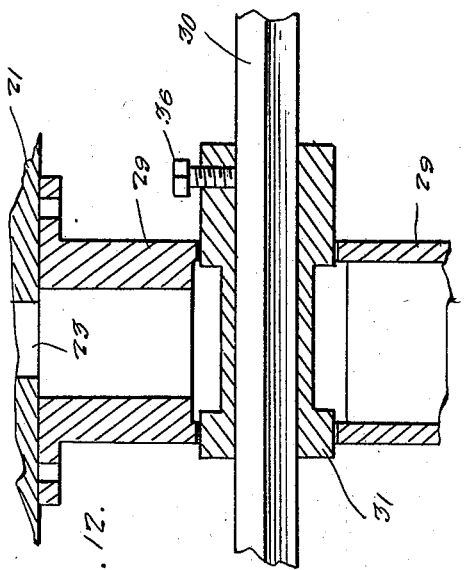
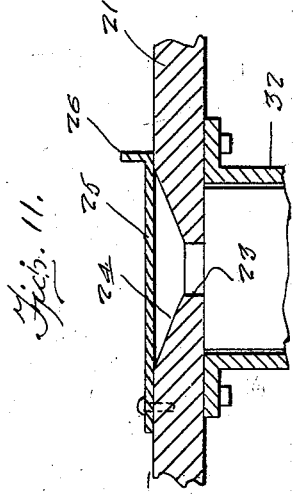
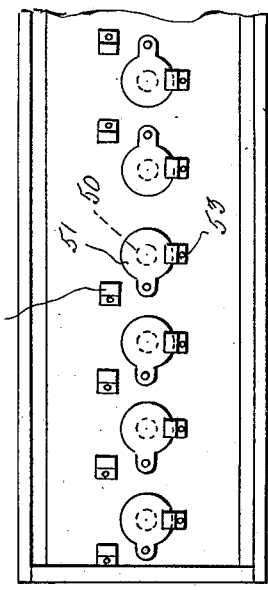
Inventor
Joseph F. Fiala
By Clarence A. O'Brien
Attorney Patented May 10, 1932

1,857,536

UNITED STATES PATENT OFFICE

JOSEPH F. FIALA, OF SOLON, IOWA

COMBINATION GRASS AND GRAIN PLANTER

Application filed February 19, 1930. Serial No. 429,644.

This invention appertains to improvements in agricultural machines and more particularly to a novel combination grass and grain planter.

The principal object of this invention is to provide a planter for grass and grain wherein one or the other may be planted independently or concurrently.

Another important object of the invention is to provide a combination planter of the character mentioned, wherein the parts are so counter-balanced as to permit the easy manipulation of the machine, without liability of tipping or divergence in travel.

In the following specification and claim, numerous important objects and advantages of the invention will readily become apparent to the reader.

In the drawings:—

Fig. 4 represents a fragmentary side elevational view showing the housing for protecting the gears.

Fig. 5 represents a vertical sectional view taken substantially on the line 5—5 of Fig. 2.

Fig. 6 represents a vertical sectional view, taken substantially on the line 6—6 of Fig. 2.

Fig. 7 represents a fragmentary detail sectional view of the structure shown in Fig. 4.

Fig. 8 represents a fragmentary detail sectional view of the bearing structure.

Fig. 9 represents a fragmentary top plan view of the grass seed box with the cover removed.

Fig. 10 represents a top plan view of the grain topper or box with the closure removed.

Fig. 11 represents a fragmentary detail sectional view through a portion of the grain dispensing means.

Fig. 12 represents a fragmentary detail sectional view of the feed means.

Figure 1:
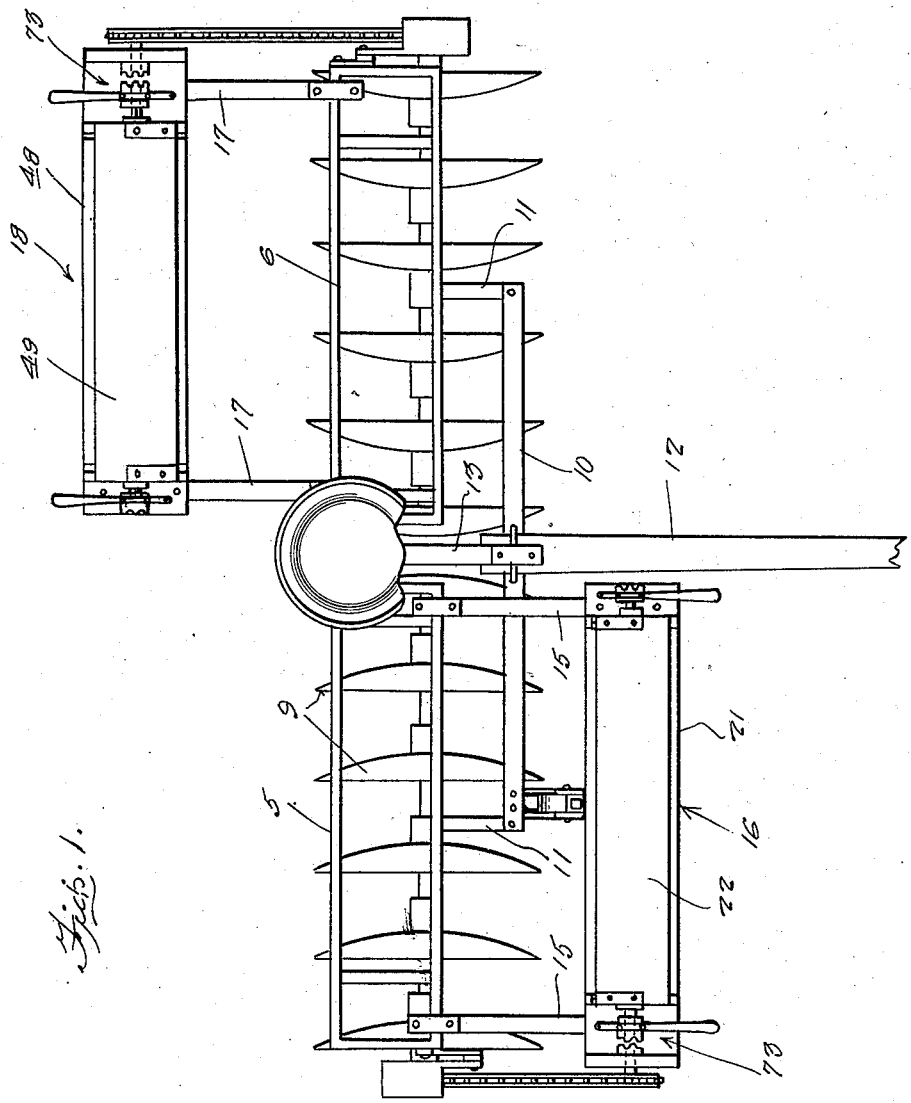
Figure 1 represents a top plan view of the novel machine.

Referring to the drawings, wherein like numerals designate like parts, it can be seen that the novel machine includes a pair of rectangular frames 5 and 6. Bars 7 depend from these frames 5 and 6 for generally receiving the disk shaft 8—8 at their lower ends. These disk shafts carry a suitable number of disks 9 and as is clearly shown in Fig. 1, these disks may be arranged in opposed groups, or in fact, in any other suitable manner.

A cross member 10 is secured to the frames 5 and 6 at its ends by connectors 11—11 and projected from the intermediate portion of this cross member 10 is the usual tongue 12. An elongated leaf spring 13 is secured at its lower end to the inner end of the tongue 12, and is curved upwardly for supporting the seat 14.

Projecting forwardly from the frame 5 are the arms 15—15 for supporting the grain dispensing mechanism generally referred to by the numeral 16, while projecting rearwardly from the frame 6 are the arms 17—17 for supporting the grass seed dispensing mechanism generally referred to by the numeral 18.

In the grain dispensing means generally referred to by numeral 16, a bar 19 connects the forward ends of the arms 15—15 and posts 20 support the seed containing box 21 above this connecting member 19.

As is clearly shown in Fig. 6, this box 21 is provided with a hinged lid 22. As is clearly shown in Fig. 10, circular openings 23 are provided at spaced intervals through the bottom of the box 21, and as is more clearly shown in Fig. 11 these openings 23 merge at their upper ends in longitudinally extending slots 24, which facilitate the discharge of grain through the openings 23.

Over each opening 23 and slot 24 is a pivotally mounted plate 25 which has an upstanding member 26 thereon to facilitate actuation thereof. Stop members 27 and 28 serve to limit motion of the plate 25 in either direction, as is apparent in Fig. 10 this plate 25 may be stopped in an open position, that is, uncovering the opening 23, oil disposed in abutting engagement with the top 28 and in a position closing the opening 23.

Depending from the bottom of the box 21 at each opening 23, is a conduit 29, and extending longitudinally beneath the box 21 and transversely through the several conduits 29 is a squared shaft 30. The shaft 30 at spaced intervals is disposed through conduits 29 and is equipped with longitudinally grooved rotors 31, each of which is flanged at its ends to prevent the escape of seed or grain.

The conduit 29 extends through an opening in the cross member 19, to merge into spouts 32, communicating at their upper ends with the conduit 29. The lower ends of the spouts terminate in heads 33 which are slotted transversely as at 34 to meet duct 35 extending through the spout, so that grain may discharge therefrom.

A set screw 36 is provided on each rotor 31 to prevent longitudinal shifting thereof on the squared shaft 30. As is clearly shown in Fig. 8, on both the grass and grain dispensing mechanisms, a cylindrical bearing 37 is provided for the squared shaft, this cylindrical bearing being disposed through a circular opening 38 in the supporting post 20. The cylindrical bearings 37 are provided with polygonal-shaped bores for receiving the squared shaft 30 and each is provided at one end with a head 39 to prevent displacement thereof in one direction, and at its opposite end is reduced as at 40 to receive the collar 41.

Thus the shafts 30, although squared, are generally supported by the post 20. A post 42 is slidably disposed through a collar 43 carried by the frame member 19 and this post 42 is provided with a fork 44 at its lower end for receiving the wheel 45.

The aforementioned arms 17—17 on which are the supporting arms 47 are provided for supporting the box. The box is provided with a hinged lid 49 and has a plurality of openings 50 in the bottom thereof. These openings 50 are normally closed by the hinged plates 51 and stops 52 and 53 serve to limit the motion of these pivotal plates. The hopper 54 depends from the bottom of the box 48 beneath each opening 50 and has its discharge end located above the adjustable gathering board 55. The means for feeding the grass grain through the hopper 54 is the same as is shown in Fig. 12, this also employing the squared shaft 30 and the grooved rotor 31.

In this manner, a regulated amount of seed is discharged through the hopper 54 and onto the adjustable platform 55. Each end of this platform is provided with a pintle extension 56 and one of the same is provided with threads as at 57. The smooth pintle is engaged in the bearing 58 (see Fig. 2) while the threaded pintle extends through one of the risers 47 and has a winged nut 59 engaged thereon and adapted to bind against the riser so as to permit the setting of the platform at any desired inclination.

Thus, when seed is discharged through the hopper 54 the same will fall onto the platform 55, and in sliding or being blown thereoff will scatter before falling onto the ground.

Figure 2:
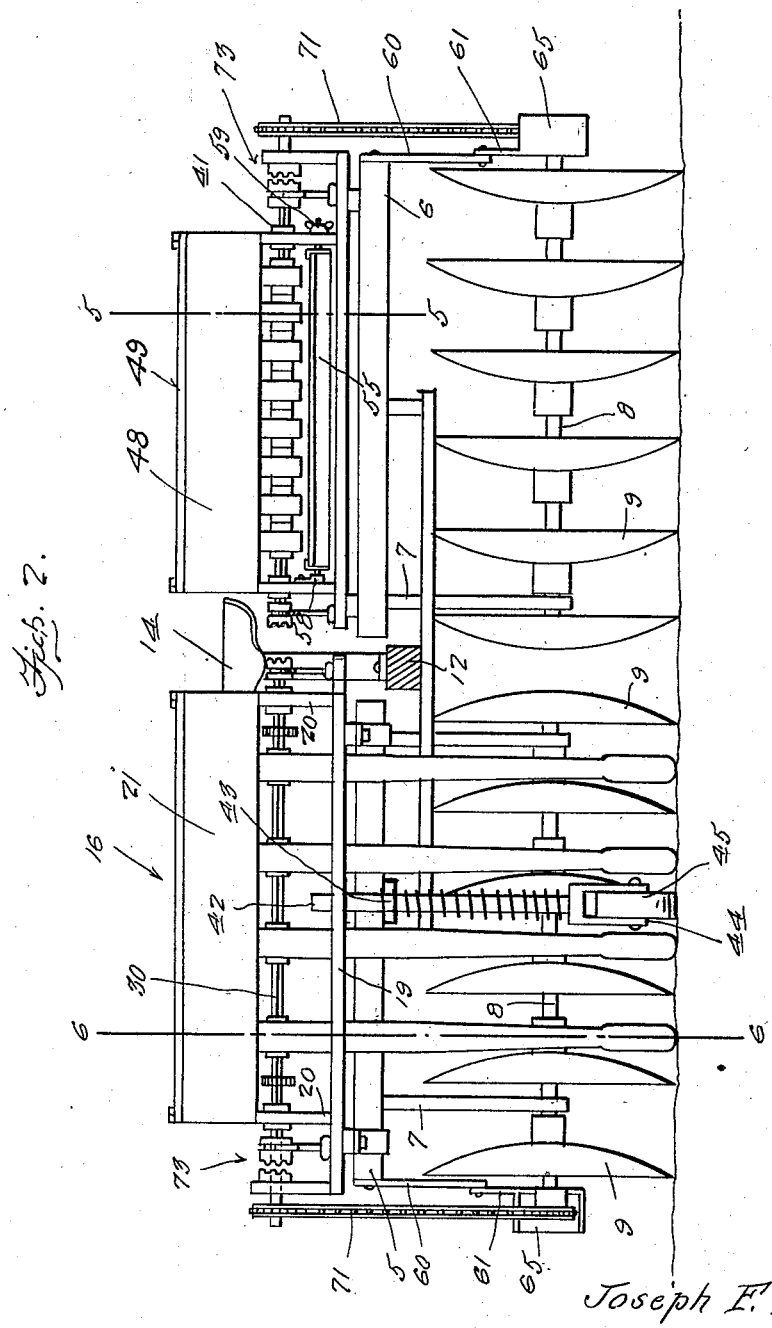
Fig. 2 represents a front elevational view of the machine.

As is clearly shown in Fig. 2, an arm 60 depends from the outer end of each of the frames 5 and 6 and the lower end of each arm 60 is pivotally connected to one end of the arm 64, and has a slot 62 therein. This slot 62, receives a threaded member 63 projecting from the reduced end 64 of a gear housing 65, and as is clearly shown in Fig. 4, each of these gear housings 65 is provided with an opening, and a bearing 66 to receive the adjacent end of the corresponding shaft 8. This bearing 66 is engaged with the housing 65 through a slot 67 and a pivotal lever 68 secured to the housing 65 as at 69 and may be swung to a position for closing the slot and preventing the separation of the housing from the shaft.

The outer end of these shafts 8 carries a sprocket wheel 70, which is located in the housing 65, and drives the sprocket chain 71, the latter in turn being trained over a sprocket 72 at the outer end of the corresponding squared shaft 30. A clutch unit is generally referred to by numeral 73, and is provided for each shaft 30, so that the same may be connected or disconnected with the source of power.

Figure 3:
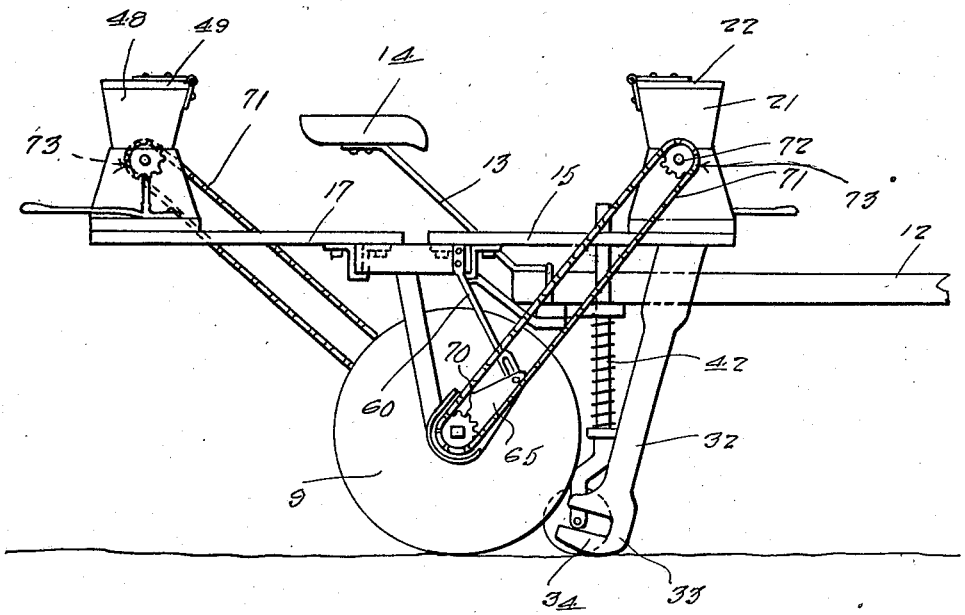
Fig. 3 represents a side elevational view of the machine.
Figure 13:
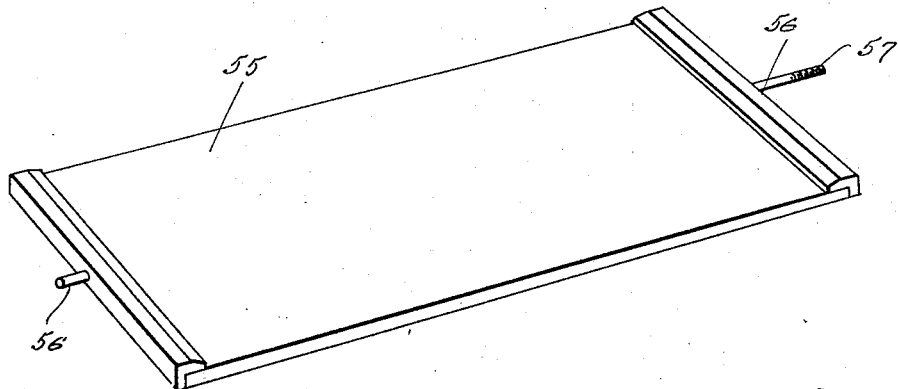
Fig. 13 represents a perspective view of the adjustable board from which the grass seed is scattered.

It will thus be seen that either the grass seed displacement mechanism or the grain displacing mechanism may be set in operation independently of the other, or both concurrently, as is desired. It will furthermore be seen, that the machine is well counterbalanced that in the case of the grain dispenser, the grain will be delivered to the ground in the manner shown in Fig. 3, while the grass will be scattered from the grass dispensing machine.

While the foregoing description sets forth the invention in detail, it is to be understood that numerous changes in the shape, size, and materials may be resorted to without departing from the spirit and scope of the invention as claimed hereinafter.

Having thus described my invention, what I claim as new is:—

A seed dispensing mechanism comprising a wheeled support, a container for the seed, a discharge spout extending from the container, and an adjustable board from which the seed may be scattered disposed under the spout, said board being provided with trunnions, supporting members for the seed container having openings therein for receiving the trunnions, one of said trunnions being provided with threads, and a nut on the said threaded trunnion for engaging the adjacent prop whereby the board may be adjusted to any suitable inclination.

In testimony whereof I affix my signature.

JOSEPH F. FIALA.